United States Patent Office 3,547,748
Patented Dec. 15, 1970

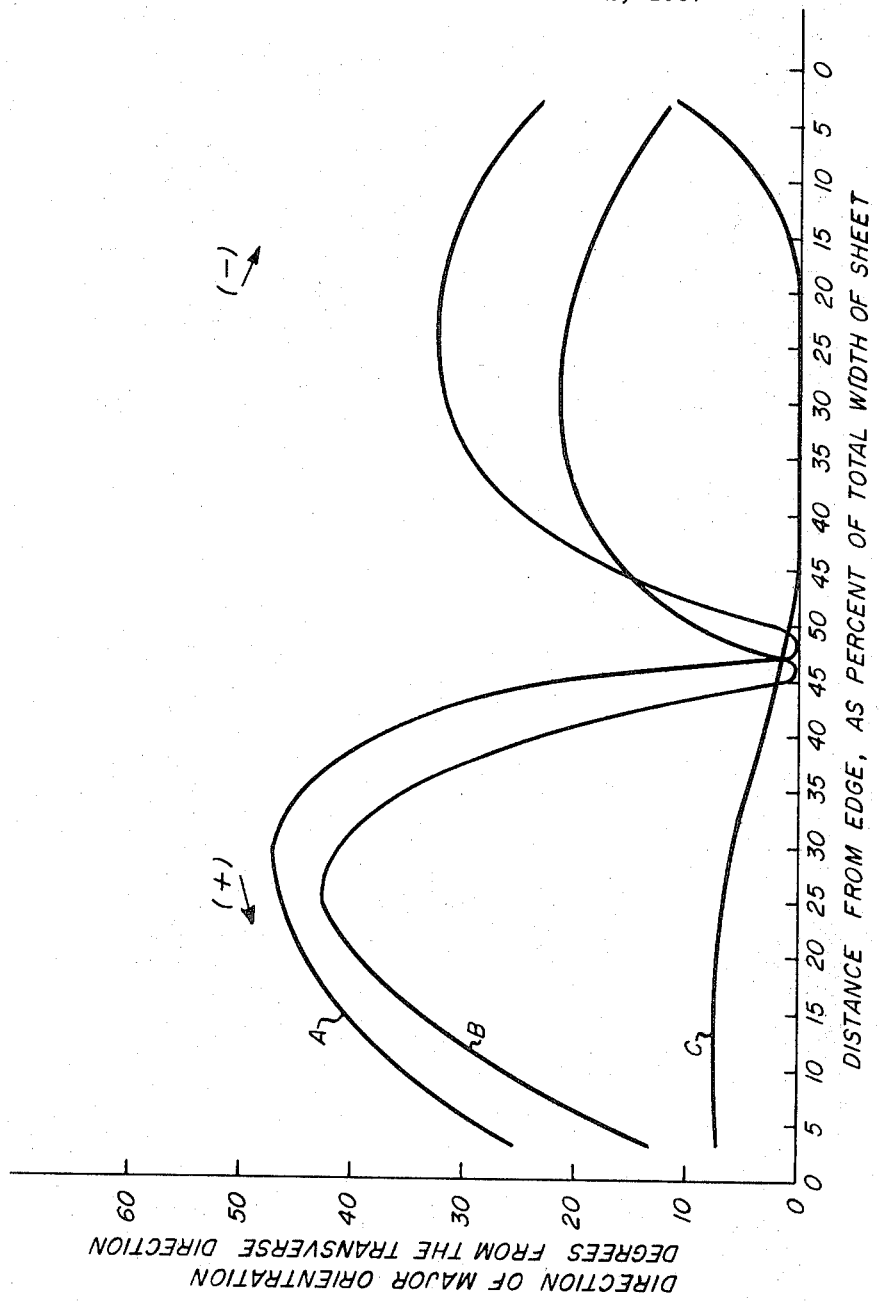

3,547,748
MANUFACTURE OF IMPROVED
POLYESTER FILMS
Edmond J. D'Onofrio and Robert B. Edwards, Rochester, N.Y., assignors to Eastman Kodak Company, Rochester, N.Y., a corporation of New Jersey
Filed Oct. 2, 1967, Ser. No. 672,126
Int. Cl. B29d 7/24
U.S. Cl. 161—46                    8 Claims

ABSTRACT OF THE DISCLOSURE

Conventionally heat-set, biaxially oriented polyester films like films of poly(ethylene terephthalate) have non-uniform physical properties across the width of the film. It has been found that by passing films exhibiting "orientation rotation" through a heated zone in a "reverse" direction while tension is maintained on said film in a transverse direction to prevent substantial shrinkage, the non-uniformity of physical properties can be practically eliminated.

---

This invention relates to improved polyester films having not only the excellent dimensional stability of conventional biaxially oriented, heat-set (thermally stabilized) polyester films, but also having a more uniform distribution of physical properties across the width of the film.

The desirability of manufacturing films having substantially uniform physical properties in both the length and width directions at any point across the width of the film is well recognized. In the case of polyester films, a typical example of somewhat undesirable, non-uniform properties is the variation in tensile break strength that exists across films that have been biaxially oriented and heat set via conventional commercial processes for their manufacture. Thus, the tensile break strength shown at one point across the width of a typical conventional biaxially oriented, heat-set polyester film (for example, at a point near one edge of the film) might differ by a factor of as much as 30% or more from that of the same film when tensile break strength is measured at a point near the center of the film. More uniformity of the various physical properties (such as, for example, tensile break strength, tensile yield, modulus of elasticity, and thermal and humidity coefficient of expansion) of the film across its width is necessary when it is desired to produce films having optimum properties for any of a number of uses, such as a base or support for highest quality photographic films, highest quality engineering drafting sheets, and the like.

Unfortunately conventional processes involving the steps of continuously stretching, tentering, and heat-setting long strips of polyester film invariably results in the production of films having a significant amount of variation (across their widths) in many of their important physical properties. Films that have such significant variations in physical properties across their widths have also been found to have a significant amount of "orientation rotation." Such "orientation rotation" has been found to be related to the degree of non-uniformity of the various physical properties across the width of the polyester films.

The term "orientation rotation" refers to the relative rotation of the major direction of orientation of the film, as determined by conventional means with polarized light. Theoretically, optimum biaxially oriented, heat-set polyester films should have their major axis of orientation parallel to either the length or width of the film. The minor axis is always perpendicular to the major axis, in either case. Also, for optimum uniformity, the extent or amount of the major and minor orientation must be essentially the same across the entire width of the film. Thus, if the direction of orientation of the major axis is exactly parallel to the width (or length) of the film in the center of the film; for optimum stability and uniformity, the direction of orientation of the major axis should be parallel to the width (or length) of the film at every point across the width of the film. When the direction of orientation of the major axis varies across the width of the film, such variance is termed "orientation rotation" across such width. Such "orientation rotation" would be expected to vary in conventionally commercially produced poly(ethylene terephthalate) films, for example, by as much as 40 degrees or more from the center to a point which is at a distance from one edge of a typical film equal to about 15% of the total width of the film.

It has now been discovered that such "orientation rotation" (along with the concomitant variation of physical properties across the width of biaxially oriented, heat-set polyester films) can be minimized, or even substantially eliminated by subjecting the biaxially oriented, heat-set film to a special heat-treating step subsequent to the original "heat-set" processing step, in which special "reorienting" heat-treating step the film is passed gradually through a heating zone in a direction opposite from that in which the film had been passed during the original "heat-set" step. Thus, the trailing edge of the film through the original "heat-setting" step becomes the leading edge of the film in the special "reorienting" heat-treating step of the present invention.

The temperature of the heated zone in which the present "reorienting" process is carried out should generally be within the range of from about 300° F. to about 435° F. and when poly(ethylene terephthalate) film is treated, is preferably within the range of from about 350° F. to about 425° F. It is especially noteworthy that these temperature ranges are practically the same as those of the initial "heat-setting" step of conventional polyester film manufacturing processes. For this reason, if it is desired to do so, the present processes can readily be incorporated into the physical arrangement of a present conventional "heat-setting" step. All that would be needed is the equipment necessary to pass the film in the reverse direction through the "heat-setting" zone (at the proper rate and temperature and under the proper amount of stress). Since, under certain conditions, it will be desirable to pass the "heat-set" films through the "heat-setting" zone in the reverse direction at a rate or speed that differs from that of the film during its initial "heat-set" passage through the zone, separate speed regulators on the equipment for passing the film in the "reverse" direction are sometimes helpful. However, it is usually more convenient from a purely manipulative standpoint to perform the present "reorientation" step or process in a heated zone that is separate from that used for originally "heat-setting" the film. This is because, in normal processing, the cooled biaxially oriented, heat-set film is wound onto a take-up reel after it has been cooled sufficiently (subsequent to the "heat-set" step). This reel can then be moved intact, if desired, to another location, where the end of the film on the outer layer of the reel (which was the trailing end of the film through the "heat-setting" step) can be fed directly into the heating zone of the present "reorientation" process (thereby becoming the leading edge or end of the film through the present "reorientation" process).

It should also be noted that during both the initial "heat-set" step and the special heat-treating process of this invention, the film must be held under tension along each edge during substantially the entire period of such treatments. In each case, mechanical grippers, usually on endless chains (which are well known in this art and need not be described in detail here) provide the necessary transverse tension on either side of the film, while concommitantly pulling the film through the heated zones. Enough tension in the transverse directions must be maintained on the film during both the "heat-set" step and the "reorientation" heat-treating step of the present invention to prevent the film from shrinking substantially during its passage through these respective heating zones. In most instances the various tensions to which the film is subjected during the initial (conventional) "heat-setting" step, as well as the manner in which these tensions are applied to the film, are matched as closely as possible during the subsequent "reorientation" heat-treating step of the present processes. Sometimes the film may be allowed to relax slightly or even be stretched slightly during the special "reorienting" heat-treating procedures of this invention. However such minor changes are made deliberately for specific purposes, and such changes in dimension are only minor when they are practiced, and the tension of the grippers on the edges of the sheets remains high nevertheless.

The present processes can also be used to "reorient" biaxially oriented, heat-set polyester film that has been purchased, and the past history of which is actually not known to the purchaser. Thus, the purchaser needs only to determine in which direction the undesired "orientation rotation" has occurred in the roll of film in question. The leading edge for the "reorientation" process step of this invention is that edge having the undesired "orientation rotation" to the left, i.e., the angle of orientation less than 45° measured in a counterclockwise direction from a transverse axis (when tested at the left edge of the film, with the leading edge away from the observer).

Multiple passes through the heated zone of the present "reorientation" processes can sometimes be used to advantage if desired. Care must be exercised, however, in such practice to be sure that the same edge of the film is used as the leading edge each time.

As it was indicated hereinbefore, the present processes can be used to correct "orientation rotation" (and the concomitant variation in valuable physical properties across the width of the film) no matter what the detailed previous history of the film had been, so long as the film is a polyester and has been biaxially oriented and heat-set. Such polyester films are made commercially, for example, via processes such as those described in U.S. Pat. 2,779,684 and in U.S. Pat. 2,823,421. Any polyester that can be manufactured in the form of a film and that can be biaxially oriented and "heat-set" in accordance with such processes as those of these patents can be treated successfully in the practice of the present invention, provided that the density after the "heat-set" step is not extremely high. However, in the preferred practice of this invention, the films that should be so treated are those comprising poly(ethylene terephthalate) or poly(cyclohexane 1,4-dimethyleneterephthalate).

In some instances, polyester films having certain fairly specific densities are desired. In conventional processes the desired density is obtained simultaneously with the "heat-setting" of the film. This is due to the fact that when polyester films are subjected to temperatures within the "heat-setting" range (i.e., above about 290° F. but below the melting point of the film in every case), there is observed, in addition to the desired thermal stabilization against shrinkage, a gradual increase in the density of the film with time (over the density range of from about 1.35 to about 1.4 in the case of poly(ethylene terephthalate), for example). Thus, in conventional processes, in order to obtain the desired density, all that has been necessary was to hold the film under "heat-setting" conditions until such desired density is reached, and then cooling the film in the usual way. However, as it was pointed out hereinbefore, such conventional "heat-set" films have always heretofore been subject to the undesired "orientation rotation" (and concomitant undesired variation in physical properties across the width of the film).

When polyester film having a certain density, but with the undesired "orientation rotation" are subjected to the special heat-treating process of this invention, generally a further increase in density (unless the density acquired during the "heat-set" step is extremely high) occurs while the undesired "orientation rotation" is being corrected. For this reason, wherever possible, in the optimum practice of this invention, the conventional "heat-set" step should be cut short; i.e., it should be stopped before the desired density is reached. Preferably the "heat-set" step should be stopped after only about two-thirds of the desired density change has occurred. For example, when poly(ethylene terephthalate) having a density of 1.383 is desired, and where the density of the film, as cast, is only about 1.36, the "heat-set" step should be conducted so that the density of the film at the end of the "heat-set" step is only about 1.374. Then, during the subsequent "reorientation" heat-treating process of the present invention, the density increases to the desired level of 1.383 while the undesired "orientation rotation" (that had been developed during the "heat-set" step) is minimized or eliminated.

When this optimum procedure is utilized, generally the initial "orientation rotation" is substantially lower than in conventional processes, because the "heat-set" step has been cut short. This improvement is illustrated in the figure, which sets out a typical example of the type of "orientation rotation" (across the width of the film) that frequently occurs during conventional "heat-set" procedures. Thus, in curve A, which represents measurements taken through a polaroscope across substantially the entire width of a conventionally "heat-set" strip of poly(ethylene terephthalate), cut across the film, an increase in degrees of "orientation rotation" of the major axis from essentially zero (at the center of the film strip) to more than 35 degrees (measured from the edge at a distance equal to about 15% of the total width of the film) is shown. The density of this film is about 1.383. In order to manufacture a film having the same density (but without the undesired "orientation rotation"), the "heat-set" step is cut short so that the density is only about 1.374 at the end of the "heat-set" step. (The maximum "orientation rotation" of this film will then be only about 25 degrees at the edge.) The variation in degrees of "orientation rotation" of this film (measured at the end of the "heat-set") step across the width of the film is shown by curve B in the figure. This film is then passed in the reverse direction (in accordance with the present invention) through a heating zone in which the temperature is maintained within the range of from about 300° F. to about 450° F. until the density of the film has increased to 1.383. At this point, the undesired "orientation rotation" has substantially vanished (see curve C in the figure). With 4-mil poly(ethylene terephthalate) film, for example, about 15 seconds exposure of the film in an atmosphere which is at a temperature of about 420° F. are required in this special "reorientation" heat-treating process.

EXAMPLE 1

A polyethylene terephthalate sheet, herein designated "Sheet A," biaxially oriented 200 percent in both the machine (draft) and transverse (tenter) directions at temperatures of 89–95° C., is thermally stabilized, i.e., heat-set, while being restrained by grippers along each edge to maintain the width dimension to the extent that the angle of major orientation relative to the transverse direction is +41° (measured at a distance from one edge equal to about 15 percent of the total width), −31° (measured at a distance from the other edge equal to 15 percent of the total width), and −3° (measured at the center-line of the sheet). The angle is designated as (+) when measured in a clockwise direction from a transverse axis and (−) when measured in a counterclockwise direction from a transverse axis (always in reference to the one surface of the sheet). Sheet A represents a conventional "heat-set" polyester film, having the undesired high degree of "orientation rotation" described above.

A second sheet, "B," biaxially oriented 200 percent to the same final thickness and at the same temperatures as Sheet A, is also heat set while being restrained along each edge as above, but to a lesser extent than Sheet A (Sheet "B" is passed at about the same speed, but at a lower temperature through the "heat-set" region of the machine), such that the angle of major orientation relative to the transverse direction is only +34° (measured at a distance from one edge equal to 15 percent of the total width), −18° (measured at a distance from the opposite edge equal to 15 percent of the total width), and −9° (measured at the centerline of the sheet).

Sheet B is then fed into the "heat-set" section of the machine without rewinding, i.e., the trailing edge emerging from the heat set section for Sheet B is now the leading edge in this "reorientation" process. The sheet is also gripped along each edge as above and heat-set by an amount which results in about the same degree of thermal stability as Sheet A as measured by the centerline sheet density using method ASTM D1506–60T. The direction of major orientation relative to the transverse direction of this "reoriented" sheet is +8° (measured at a distance from one edge equal to 15 percent of the total width, −1° (measured at a distance from the opposite edge equal to 15 percent of the total width) and +1° (measured at the centerline of the sheet). This sheet, which represents a preferred embodiment, of this invention, is designated as Sheet C in Table 1.

TABLE 1.—ANGLE OF MAJOR ORIENTATION RELATIVE TO TRANSVERSE DIRECTION

| Sheet | At distance equal to 15% of width from Edge 1 | At centerline of sheet | At distance equal to 15% of width from Edge 2 | Centerline density |
|---|---|---|---|---|
| A | +41° | −3° | −31° | 1.3907 |
| B | +34° | −9° | −18° | |
| C | +8° | −1° | −1° | 1.3928 |

The method described above, which in effect, insures that the directions of major and minor orientation are aligned with the directions corresponding to the transverse and machine directions, also has a beneficial effect on the property balance of the sheet. The Sheets A and C above, are sampled in the major and minor orientation directions at positions corresponding to the distance from each edge equal to 15 percent of the total width of the sheet and also at the centerline of the sheet. The tensile strength and elastic modulus are measured using ASTM methods D882–61T and the results shown in Tables 2 and 3.

EXAMPLE 2

A polyethylene terephthalate sheet, D, is drafted and tentered at the same conditions and to the same extent as Sheets A and B of Example 1. This sheet is heat-set, while being restrained by grippers along each edge to maintain the width dimension, but to a much greater extent than Sheet A. The angle of major orientation relative to a transverse axis is measured at the same positions on the sheet as for Example 1.

A polyethylene terephthalate sheet, E, drafted and tentered at the same conditions and to the same extent as Sheet D, is heat-set using the same method as for Sheet D but to a much leser extent. The major orientation direction is measured at the same relative positions across the width of the sheet as in Example 1.

Sheet E is again fed into the heat-set section of the machine without rewinding (i.e., in a reverse direction), gripped along each edge to maintain the width dimension, and heat-set by an amount which results in the same degree of thermal stability as obtained for Sheet D. The angle of major orientation is measured at the same positions as in Example 1 for this sheet, designated as "Sheet F" in Table 4. Example 2 clearly illustrates the universatility of the method as shown by the overall reduction of the angle of major orientation for Sheet F as compared to Sheet D.

TABLE 4.—ANGLE OF MAJOR ORIENTATION RELATIVE TO TRANSVERSE DIRECTION

| Sheet | 15% of width from Edge 1 | Center line of sheet | 15% of width from Edge 1 | Density |
|---|---|---|---|---|
| D | +46 | 0 | −43 | 1.3974 |
| E | +41 | −2 | −30 | |
| F | +9 | +9 | +3 | 1.3974 |

EXAMPLE 3

The Sheet B of Example 1 is rewound and the leading edge, i.e., the edge emerging first from the heat-set section when Sheet B was orginally made, is also the leading edge when this sheet is again fed into the heat-set section of the machine. The sheet is gripped along each edge to maintain the width dimension while being heat-set by an amount resulting in the same level of thermal stability as for Sheet A. The direction of the major orientation for this sheet, designated as G in Table 5, is measured at the same relative positions as for Sheet A. The results, while showing a small reduction in the angle of major orientation, indicate that this two-step heat-setting process (where both steps are in the same "forward" direction through the "heat-setting" zone), in effect, will give a sheet similar to A with the undesirable large angles of major and minor orientation at the edges relative to the transverse and machine directions.

TABLE 2

[Tensile Break Strength, p.s.i.]

| | 15% of width from Edge 1 | | | Centerline of sheet | | | 15% of width from Edge 2 | | |
|---|---|---|---|---|---|---|---|---|---|
| Sheet | Major | Minor | Percent diff. | Major | Minor | Percent diff. | Major | Minor | Percent diff. |
| A | 34,300 | 29,800 | 13.1 | 31,800 | 29,300 | 7.8 | 34,400 | 29,700 | 13.7 |
| C | 33,200 | 32,000 | 3.6 | 32,000 | 30,600 | 4.3 | 33,400 | 31,000 | 7.2 |

TABLE 3

[Modulus of Elasticity X10⁻⁵ p.s.i.]

| | 15% of width from Edge 1 | | | Centerline of sheet | | | 15% of width from Edge 2 | | |
|---|---|---|---|---|---|---|---|---|---|
| Sheet | Major | Minor | Percent diff. | Major | Minor | Percent diff. | Major | Minor | Percent diff. |
| A | 6.5 | 5.1 | 21.6 | 6.5 | 6.5 | 0 | 6.6 | 5.7 | 13.6 |
| C | 6.6 | 6.4 | 3.0 | 6.6 | 6.7 | 1.5 | 6.7 | 6.1 | 9.0 |

TABLE 5.—ANGLE OF MAJOR ORIENTATION RELATIVE TO TRANSVERSE DIRECTION

| Sheet: | 15% of width from Edge 1 | Center line of sheet | 15% of width from Edge 1 | Density |
|---|---|---|---|---|
| A | +41° | −3° | −31° | 1.3907 |
| G | +29 | −3 | −25 | 1.3925 |

Since the undesired variation in physical properties across the width of polyester films can apparently be roughly correlated with the "orientation rotation" described above, and since perhaps the easiest method of both (a) identifying the initial shortcomings of such films and (b) observing the disappearance as such shortcomings during the practice of this invention is in terms of the relative extent of "orientation rotation" that is observed at a point corresponding to a distance of about 15% of the total width of the film, then the present invention can be summarized as follows:

The present invention involves passing biaxially oriented, "heat-set" polyester film (having at least about 5 degrees of orientation rotation, measured at a point which is about 15% of the distance from one edge of the film) in a direction that is the reverse of that in which the film was passed through an initial heated zone in which it was "heat-set," through a "reorientation" heated zone for a period of time sufficient to reduce said orientation rotation at least a significant amount (preferably by at least 5 degrees). During the pasage of the film through these heated zones, a significant amount of tension is maintained on the film in the transverse direction in order to prevent a significant amount of shrinkage during the heat treatments. The amount of time in this "reorientation" heating zone is preferably at least about 5 seconds.

The direction in which the film was passed through the initial "heat-setting" zone can also be determined by a simple trial and error heat-treating method having the foregoing description of the present invention in mind.

The invention has been described in detail with particular reference to preferred embodiments thereof, but it will be understood that variations and modifications can be effected within the spirit and scope of the invention as described hereinabove and as defined in the appended claims.

We claim:

1. In a process for manufacturing biaxially oriented, dimensionally stabilized polyester film, which process comprises the steps of biaxially orienting said film by stretching it at elevated temperatures and subsequently heat-setting the biaxially oriented film at an elevated temperature by passing in a forward direction said biaxially oriented film through a first heated zone under sufficient transverse tension to thereby produce a heat-set film having at least 5° of orientation rotation at a point which is about 15% of the distance from one edge of said film; the improvement which comprises gradually passing said heat-set film through a second heated zone in a reverse direction, as compared with the direction of passage of said film through said first heating zone and at a rate sufficient to reduce said orientation rotation by at least about 5°; said second heating zone being maintained at a temperature of from about 300° F. to about 435° F. and said film being maintained under sufficient transverse tension during its passage through said second heating zone to prevent a significant amount of transverse shrinkage of said film during said passage.

2. An improved process as in claim 1, wherein said polyester is selected from the group consisting of poly(ethylene terephthalate) and poly(cyclohexane, 1-4-dimethylene terephthalate).

3. An improved process as in claim 2, wherein the amount of time required to pass said heat-set film through said second heating zone is at least about 5 seconds.

4. An improved process as in claim 3, wherein said polyester is poly(ethylene terephthalate).

5. An improved process as in claim 1, wherein said first heating zone and said second heating zone are the same heating zone.

6. A dimensionally stabilized, biaxially oriented polyester film having across said film a uniform angle of rotation of the major axis.

7. A dimensionally stabilized biaxially oriented film as in claim 6, wherein said polyester is selected from the group consisting of poly(ethylene terephthalate) and poly(cyclohexane, 1-4-dimethylene terephthalate).

8. A dimensionally stabilized, biaxially oriented film as in claim 6, wherein said polyester is poly(ethylene terephthalate).

References Cited

UNITED STATES PATENTS

| | | | |
|---|---|---|---|
| 3,275,612 | 2/1966 | Bechtold | 260—88.7 |
| 3,461,199 | 8/1969 | Campbell | 264—289 |
| 3,479,426 | 11/1969 | De Smedt | 264—289 |

JOHN T. GOOLKASIAN, Primary Examiner

JOSEPH C. GIL, Assistant Examiner

U.S. Cl. X.R.

161—271, 402; 264—234, 235, 289, 342, 346